(12) United States Patent
Scatterday et al.

(10) Patent No.: US 10,273,703 B2
(45) Date of Patent: Apr. 30, 2019

(54) ADAPTER FOR POOL CLEANING SYSTEM

(71) Applicant: Blue Square Manufacturing, LLC, Chandler, AZ (US)

(72) Inventors: Mark Scatterday, Scottsdale, AZ (US); David Johnson, New River, AZ (US); Robert Michael Long, Chandler, AZ (US); Timothy Murphy, Scottsdale, AZ (US); Michael Landis, Gilbert, AZ (US)

(73) Assignee: Blue Square Manufacturing, LLC, Chandler, AZ (US)

( * ) Notice: Subject to any disclaimer, the term of this patent is extended or adjusted under 35 U.S.C. 154(b) by 54 days.

(21) Appl. No.: 15/332,977

(22) Filed: Oct. 24, 2016

(65) Prior Publication Data
US 2017/0114559 A1    Apr. 27, 2017

Related U.S. Application Data

(60) Provisional application No. 62/245,855, filed on Oct. 23, 2015.

(51) Int. Cl.
*E04H 4/16* (2006.01)
*E04H 4/12* (2006.01)
(Continued)

(52) U.S. Cl.
CPC ............. *E04H 4/1672* (2013.01); *E04H 4/12* (2013.01); *E04H 4/16* (2013.01); *F16K 11/074* (2013.01); *F16K 31/52483* (2013.01); *F16L 3/22* (2013.01); *F16L 9/18* (2013.01); *F16L 9/19* (2013.01); *F16L 9/20* (2013.01); *B01D 29/668* (2013.01); *Y10T 137/0324* (2015.04); *Y10T 137/86413* (2015.04); *Y10T 137/86501* (2015.04); *Y10T 137/86863* (2015.04); *Y10T 137/86911* (2015.04); *Y10T 137/87249* (2015.04)

(58) Field of Classification Search
CPC ..... Y10T 137/86413; Y10T 137/86501; Y10T 137/86911; Y10T 137/86863; Y10T 137/87249; Y10T 137/0324; F16K 11/074; F16K 31/52483; B01D 29/668; E04H 4/16; E04H 4/12
See application file for complete search history.

(56) References Cited

U.S. PATENT DOCUMENTS 3,018,788 A    1/1962   Perlis
3,408,006 A   10/1968   Stanwood
(Continued)

*Primary Examiner* — Atif H Chaudry
(74) *Attorney, Agent, or Firm* — Schmeiser, Olsen & Watts LLP

(57) ABSTRACT

An adapter for a pool cleaning system is provided. The adapter includes a base member having a top and a bottom surface. The adapter also includes six upper ports coupled to the top surface of the base member, each upper port including an upper aperture extending through the upper port and through the base member. The adapter further includes five lower ports coupled to the bottom surface of the base member, each lower port including a lower aperture extending through the lower port and through the base member. In some embodiments, four of lower ports are in fluid communication four of the upper ports and one of the lower ports is in fluid communication with two of the upper ports.

19 Claims, 6 Drawing Sheets

(51) Int. Cl.
*F16L 3/22* (2006.01)
*F16L 9/19* (2006.01)
*F16K 31/524* (2006.01)
*F16L 9/18* (2006.01)
*F16K 11/074* (2006.01)
*B01D 29/66* (2006.01)

(56) References Cited

U.S. PATENT DOCUMENTS

| | | |
|---|---|---|
| 3,715,078 A | 2/1973 | Reynolds |
| 4,077,424 A | 3/1978 | Ehret et al. |
| 4,116,216 A | 9/1978 | Rosenberg |
| 4,220,283 A | 9/1980 | Citron |
| 4,313,455 A | 2/1982 | Pitman |
| 4,523,606 A | 6/1985 | Gould et al. |
| 4,570,663 A | 2/1986 | Gould et al. |
| 4,592,379 A | 6/1986 | Goettl |
| 4,746,424 A | 5/1988 | Drew |
| 4,817,656 A * | 4/1989 | Gould .................... F16K 11/166 137/118.06 |
| 4,989,641 A * | 2/1991 | Jones .................... F16K 11/085 137/625.11 |
| 6,189,556 B1 | 2/2001 | Blake et al. |
| 6,314,999 B1 * | 11/2001 | Conn .................... F16K 11/163 137/119.07 |
| 6,325,087 B1 | 12/2001 | Tarr |
| 6,360,767 B1 * | 3/2002 | Barnes .................... E04H 4/169 137/119.07 |
| 6,539,967 B2 | 4/2003 | Tarr |
| 6,732,760 B2 * | 5/2004 | Mellado ................ F16K 11/165 137/119.07 |
| 6,848,124 B2 | 2/2005 | Goettl |
| 6,854,148 B1 | 2/2005 | Rief et al. |
| 7,571,496 B2 | 8/2009 | Martin |
| 8,714,182 B2 | 5/2014 | Malinasky, Jr. |
| 9,222,274 B1 | 12/2015 | Goettl et al. |
| 9,625,041 B1 * | 4/2017 | Lopez .................... F16K 11/06 |

\* cited by examiner

ADAPTER FOR POOL CLEANING SYSTEM

CROSS REFERENCE TO RELATED APPLICATION[S]

This application claims priority to U.S. Provisional Patent Application entitled "ADAPTER FOR POOL CLEANING SYSTEM," Ser. No. 62/245,855, filed Oct. 23, 2015, the disclosure of which is hereby incorporated entirely herein by reference.

BACKGROUND OF THE INVENTION

Technical Field

This invention relates generally to valves for a pool cleaning system and more particularly to an adapter for use on an in-floor pool cleaning system.

State of the Art

In certain areas of the country and the world, residents are inclined to have a swimming pool on their property. These pools provide a great opportunity for recreation, but also require consistent maintenance. One aspect of pool maintenance that must be present is cleaning of the pool. In most instances, some type of automated cleaning is used as part of the cleaning of the pool. Some of these pool cleaning systems include systems such as suction-side pool cleaners, pressure side pool cleaners, robotic pool cleaners, and in-floor pool cleaning systems.

In-floor pool cleaning systems require a valve that distributes water through various ports to deliver to a pop-up nozzle located on the pool floor. A common number of ports are five. The valves are specific to these types of ports, wherein valves are created to have 5 ports coinciding with the 5 ports delivering water to the popup nozzles. These 5 port systems are lacking in the ability to be used with another type of valve, such as a 6 port valve.

Accordingly, there is a need for a device that allows a 5 port in-floor pool cleaning system to be used with another type of valve different from a 5 port valve.

SUMMARY OF THE INVENTION

The present invention relates to an adapter for use with an in-floor pool cleaning system, wherein the adapter provides the ability to couple a 6 port valve to a 5 port in-floor pool cleaning system.

In an embodiment, an adapter for a pool cleaning system comprises a base member having a top and a bottom surface; a plurality of upper ports coupled to the top surface of the base member, each upper port including an upper aperture extending through the upper port and through the base member; and a plurality of lower ports coupled to the bottom surface of the base member, each lower port including a lower aperture extending through the lower port and through the base member, wherein the number of upper ports is greater than the number of lower ports and the aperture of each upper port is in fluid communication with at least one aperture of the lower ports.

In another embodiment, an adapter for a pool cleaning system comprises a base member having a top and a bottom surface; six upper ports coupled to the top surface of the base member, each upper port including an upper aperture extending through the upper port and through the base member; and five lower ports coupled to the bottom surface of the base member, each lower port including a lower aperture extending through the lower port and through the base member, wherein four of lower ports are in fluid communication four of the upper ports and one of the lower ports is in fluid communication with two of the upper ports.

In another embodiment, an in-floor pool cleaning system comprising: a five port in-floor pool cleaning system; a six port valve; and an adapter comprising: a base member having a top and a bottom surface; six upper ports coupled to the top surface of the base member, each upper port including an upper aperture extending through the upper port and through the base member; and five lower ports coupled to the bottom surface of the base member, each lower port including a lower aperture extending through the lower port and through the base member, wherein four of the lower ports are in fluid communication four of the upper ports and one of the lower ports are in fluid communication with two of the upper ports, wherein the five port in-floor pool cleaning system is coupled to the five lower ports and the six port valve is coupled to the six upper ports and accordingly also the five lower ports.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
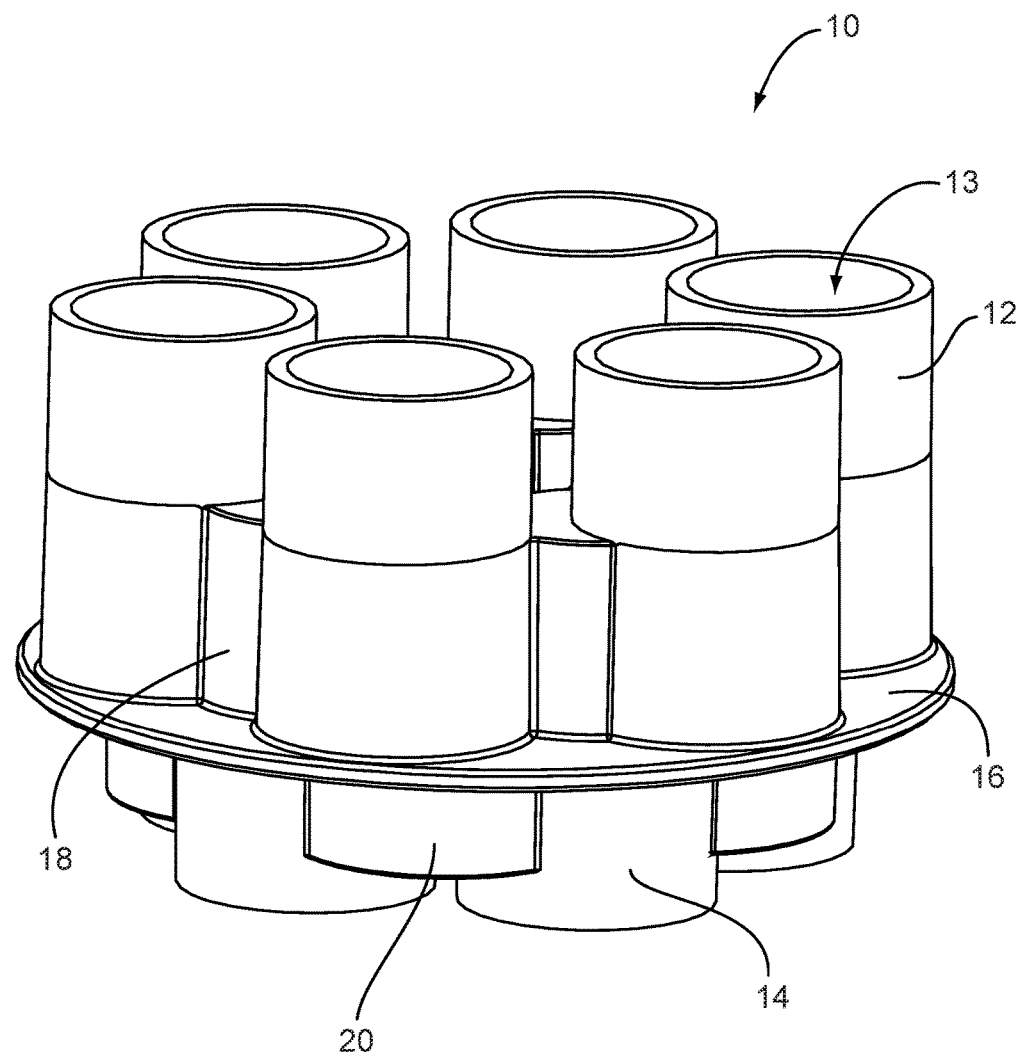
FIG. 1 is a top perspective view of an adapter.
Figure 2:
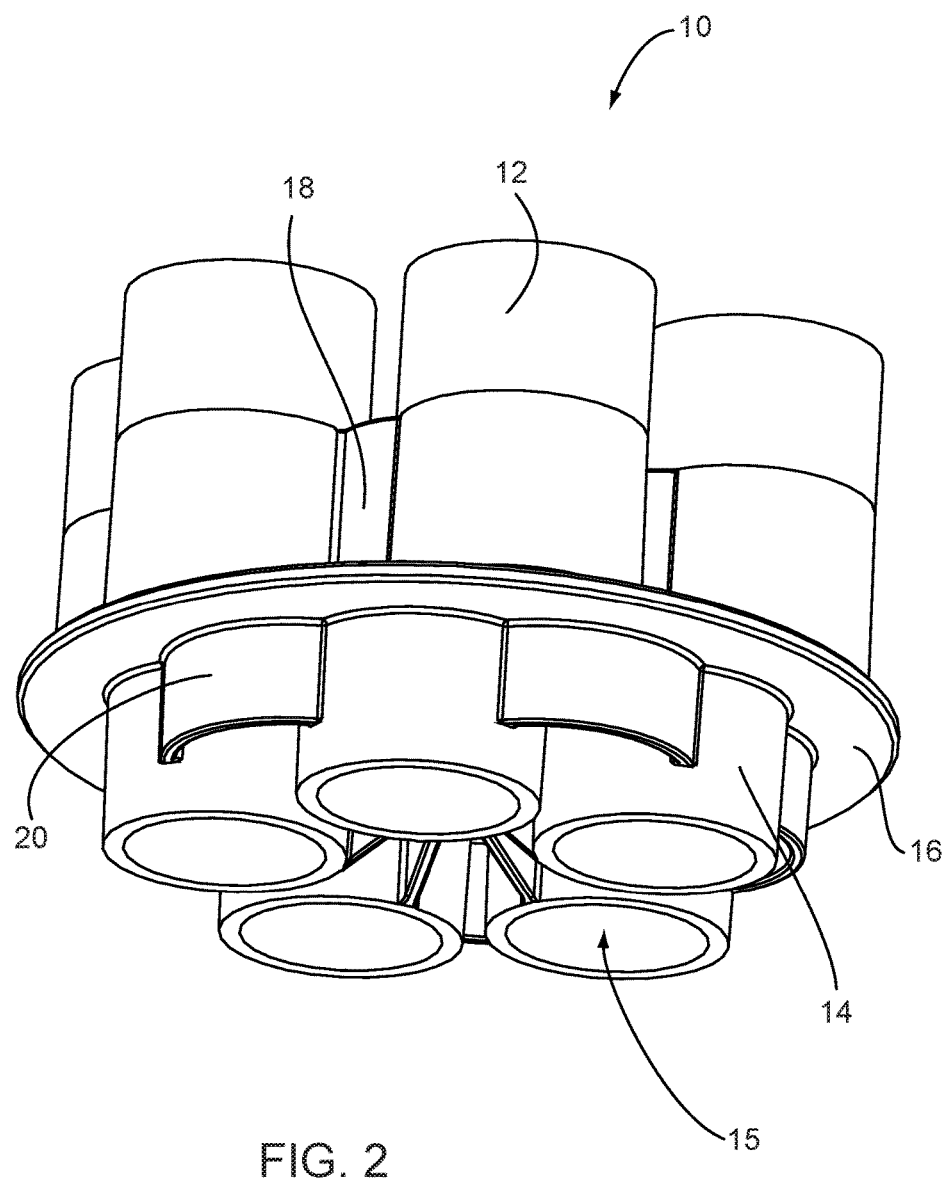
FIG. 2 is a bottom perspective view of an adapter.

As discussed above, embodiments of the present invention relate to an adapter for use with an in-floor pool cleaning system, wherein the adapter provides the ability to couple a six port valve to a five port in-floor pool cleaning system.

FIGS. 1-6 depict an adapter 10 for use with an in-floor pool cleaning system. Adapter 10 may include an upper port 12. As shown, there may be six upper ports 12, wherein each upper port 12 includes an upper aperture 13 extending there through. In embodiments, upper aperture 13 extending through upper port 12 may be a cylindrical upper aperture 13, wherein the cylindrical shape corresponds to a shape of a valve 40. The upper ports 12 may be coupled to a top surface 30 of a base member 16. Upper aperture 13 may extend through base member 16.

Further, upper support structures 18 may be coupled between the upper ports 12 for added strength to adapter 10. According to some embodiments, upper ports 12 may be spaced an equal radial distance from a center of base member 16. Further, upper ports 12 may be distributed substantially equal arc lengths from each adjacent upper port 12.

Adapter 10 may include a lower port 14. As shown, there may be five lower ports 14, wherein each lower port 14 includes a lower aperture 15 extending there through. In embodiments, lower aperture 15 extending through lower port 14 may be a cylindrical aperture 15, wherein the cylindrical shape corresponds to a shape of in-line floor cleaner ports 42. The lower ports 14 may be coupled to a bottom surface 32 of base member 16. Lower aperture 15 may extend through base member 16.

Further, lower support structures 20 may be coupled between the lower ports 14 for added strength to the adapter 10. According to some embodiments, lower ports 14 may be spaced an equal radial distance from a center of base member 16. Further, lower ports 14 may be distributed substantially equal arc lengths from each adjacent lower port 14.

Figure 3:
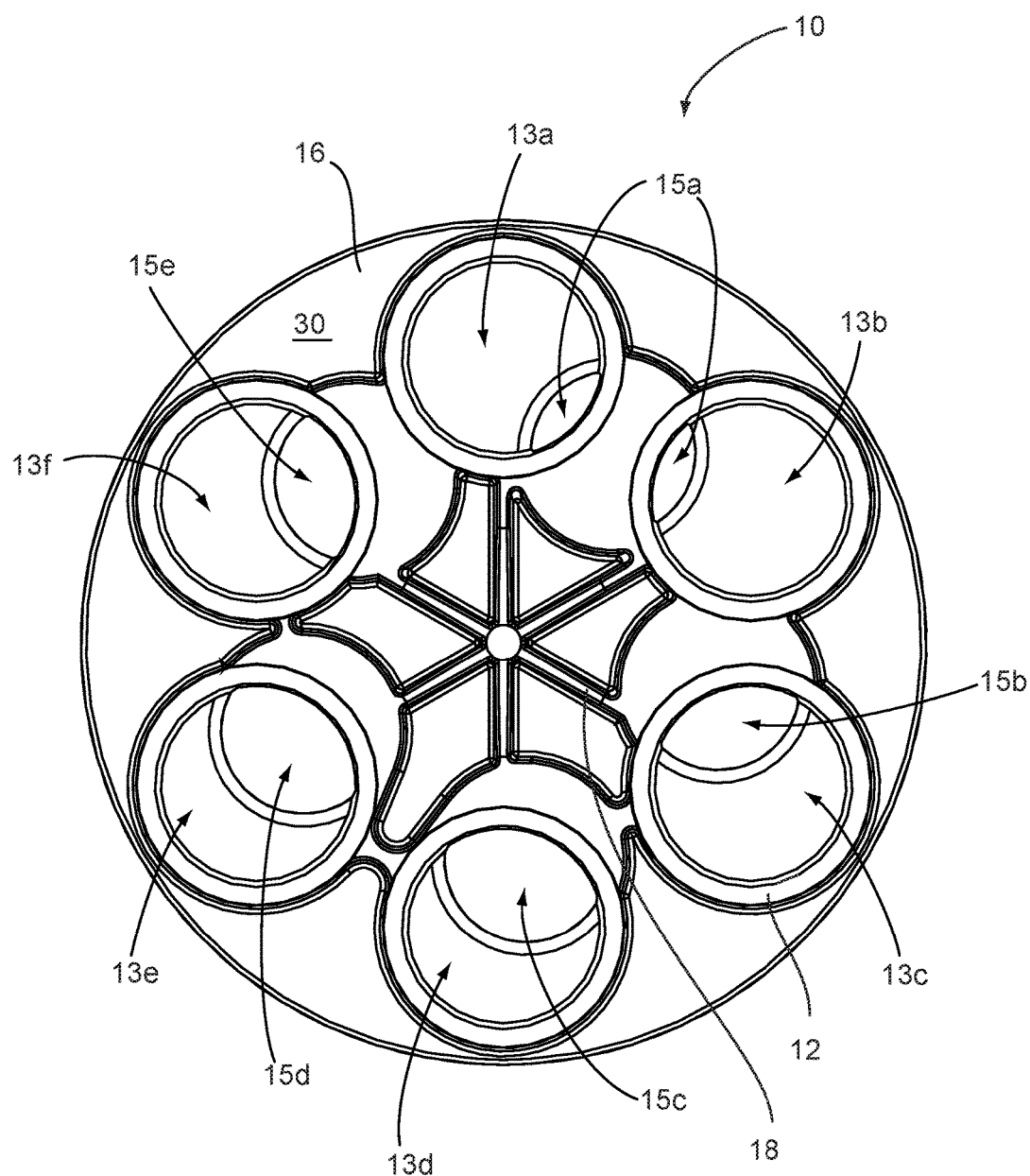
FIG. 3 is a top view of an adapter.
Figure 4:
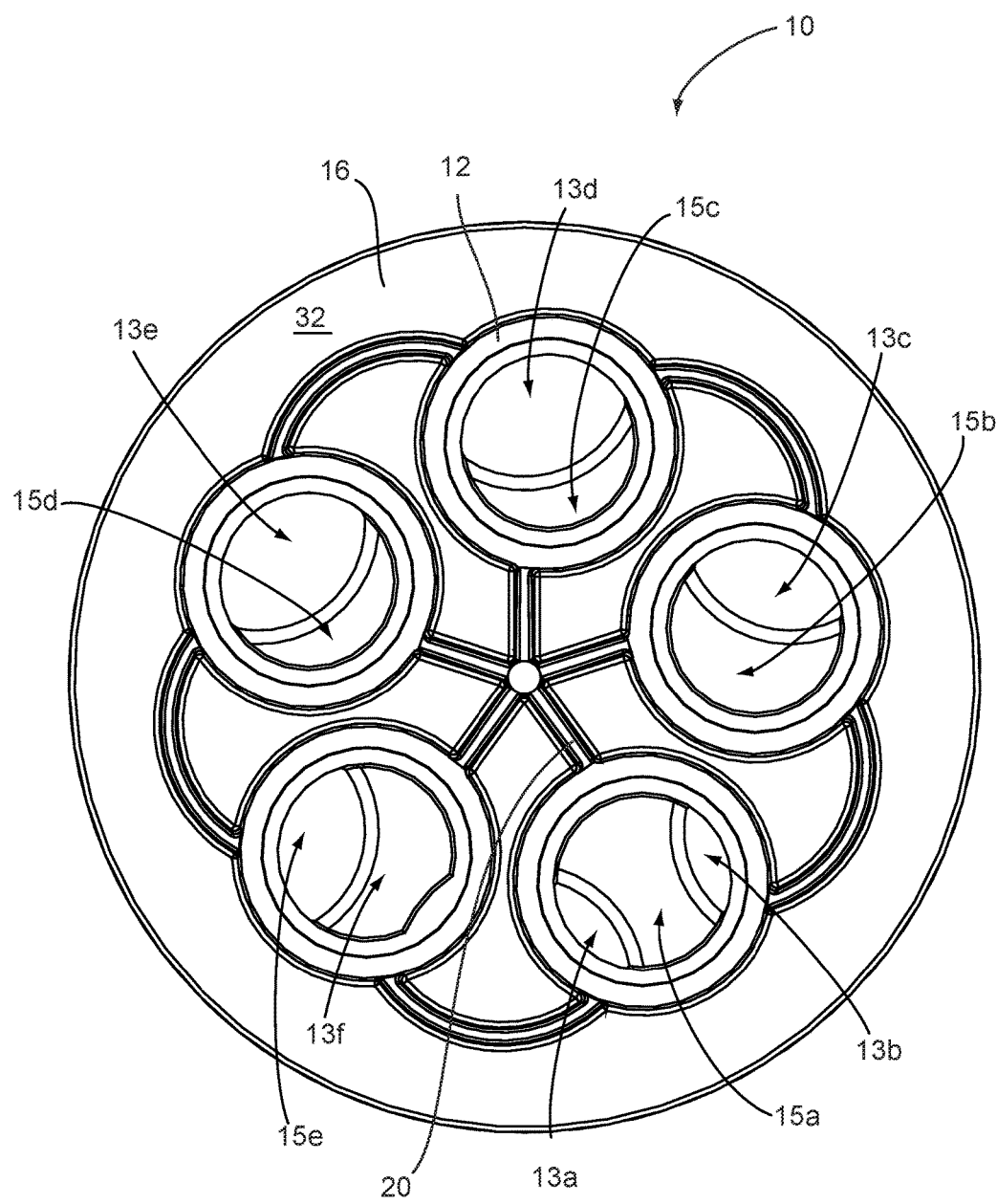
FIG. 4 is a bottom view of an adapter.
Figure 5:
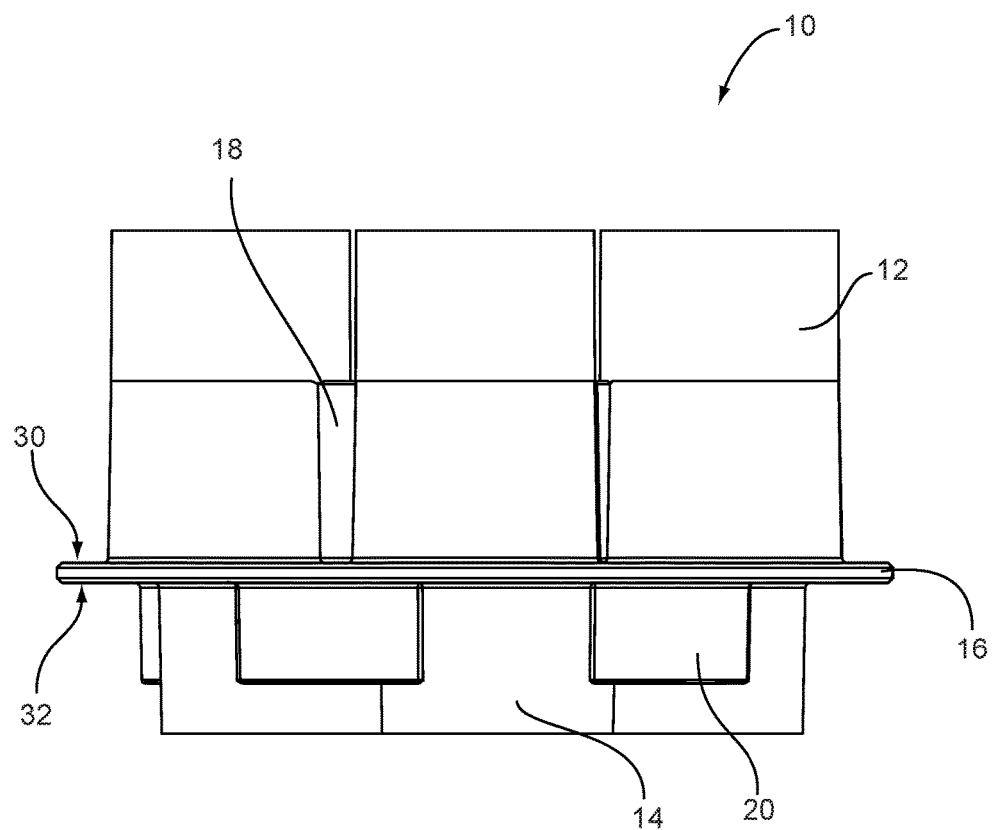
FIG. 5 is a side view of an adapter.
Figure 6:
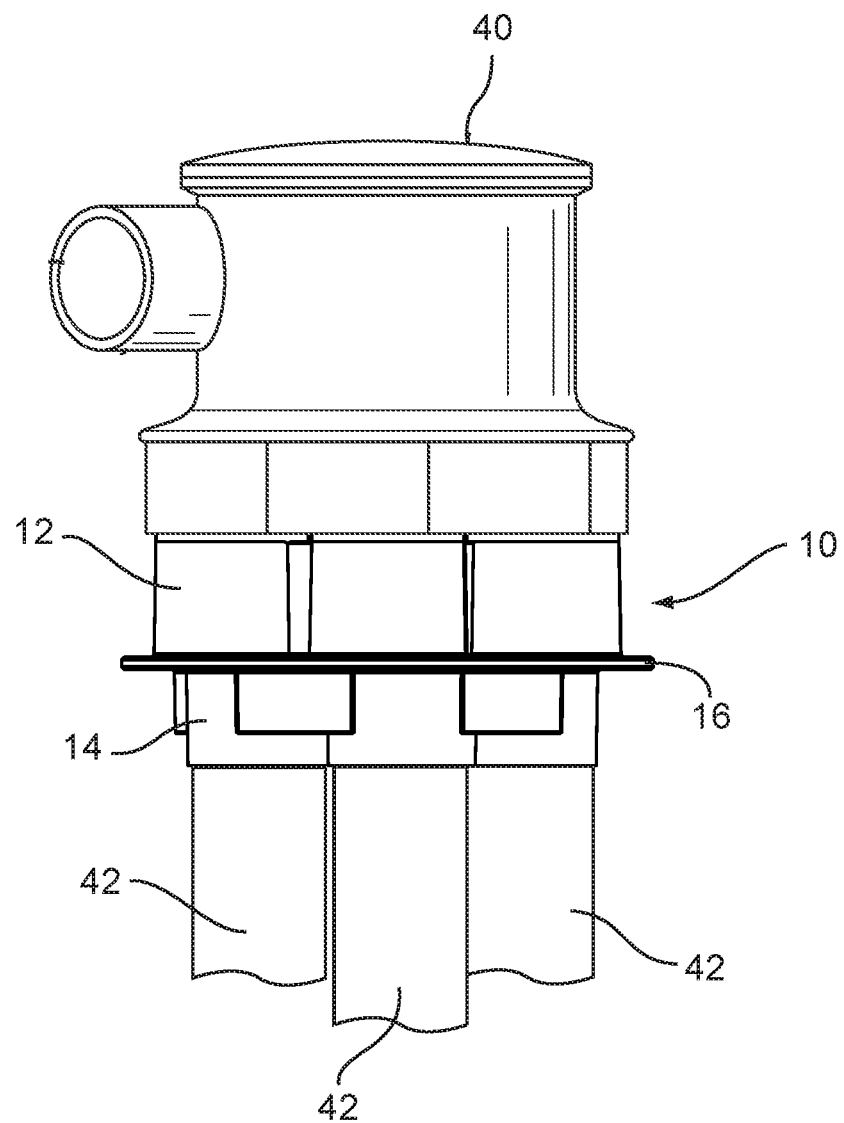
FIG. 6 is a side view of an adapter coupled between a six port valve and five ports of the pool cleaning system.

Referring specifically to FIGS. 3 and 4, upper apertures 13 may include six upper apertures 13a, 13b, 13c, 13d, 13e, and 13f; and lower apertures 15 may include five lower apertures 15a, 15b, 15c, 15d and 15e. In the embodiments shown in FIGS. 3 and 4, upper apertures 13a and 13b are in fluid communication with lower aperture 15a; upper aperture 13c is in fluid communication with lower aperture 15b; upper aperture 13d is in fluid communication with lower aperture 15c; upper aperture 13e is in fluid communication with lower aperture 15d; and upper aperture 13f is in fluid communication with lower aperture 15e. These fluid communications between upper apertures 13 and lower apertures 15 allows for water to flow through a six port valve 40 and direct water through the five ports 42 of the in-line pool cleaning system.

Further, some pools may include an area of the pool that generally requires additional cleaning, such as a deeper end of the pool or one close to where more debris is collected. In these embodiments, a port 42 of the in-line pool system that is fluidly coupled to the popup nozzle that is set to clean those particular areas of the pool may be coupled to lower port 15a. As the six port valve 40 systematically directs water through each upper port 13a-f, when water is directed through upper port 13a and then 13b, the water is directed through lower port 15a. This operates the popup nozzle connected to port 42 coupled to lower port 15a.

Embodiments are not limited to uses of any specific components, provided that the components selected are consistent with the intended operation of an adapter for a pool cleaning system.

Accordingly, the components defining any adapter for a pool cleaning system may be formed of any of many different types of materials or combinations thereof that can readily be formed into shaped objects provided that the components selected are consistent with the intended operation of an adapter for a pool cleaning system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any adapter for a pool cleaning system may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An adapter for a pool cleaning system, the adapter comprising:
   a base member having a top and a bottom surface;
   a plurality of upper ports coupled to the top surface of the base member, each upper port including an upper aperture extending through the upper port and through the base member; and
   a plurality of lower ports coupled to the bottom surface of the base member, each lower port including a lower aperture extending through the lower port and through the base member, wherein the number of upper ports is greater than the number of lower ports and the aperture of each upper port is in fluid communication with at least one aperture of the lower ports, and wherein each lower port of the plurality of lower ports is spaced an equal radial distance from a center of the base member.

2. The adapter of claim 1, wherein each upper port comprises a cylindrical upper aperture, wherein the cylindrical shape corresponds to a shape of a valve.

3. The adapter of claim 1, further comprising upper support structures coupled between the plurality of upper ports, wherein the upper support structures provide added strength to the adapter.

4. The adapter of claim 1, wherein each upper port of the plurality of upper ports is spaced an equal radial distance from a center of base member.

5. The adapter of claim 4, wherein each upper port of the plurality of ports is distributed substantially equal arc lengths from each adjacent upper port.

6. The adapter of claim 1, wherein each lower port comprises a cylindrical lower aperture extending there through, wherein the cylindrical shape corresponds to a shape of an in-line floor cleaner port.

7. The adapter of claim 1, further comprising lower support structures coupled between the plurality of lower ports, wherein the lower support structures provide added strength to the adapter.

8. The adapter of claim 1, wherein each lower port of the plurality of lower ports is distributed substantially equal arc lengths from each adjacent lower port.

9. An adapter for a pool cleaning system, the adapter comprising:
   a base member having a top and a bottom surface;
   six upper ports coupled to the top surface of the base member, each upper port including an upper aperture extending through the upper port and through the base member; and
   five lower ports coupled to the bottom surface of the base member, each lower port including a lower aperture extending through the lower port and through the base member, wherein four of lower ports are in fluid communication four of the upper ports and one of the lower ports are in fluid communication with two of the upper ports.

10. The adapter of claim 9, wherein each upper port comprises a cylindrical upper aperture, wherein the cylindrical shape corresponds to a shape of a valve.

11. The adapter of claim 9, further comprising upper support structures coupled between the upper ports, wherein the upper support structures provide added strength to the adapter.

12. The adapter of claim 9, wherein each upper port is spaced an equal radial distance from a center of base member.

13. The adapter of claim 12, wherein each upper port is distributed substantially equal arc lengths from each adjacent upper port.

14. The adapter of claim 9, wherein each lower port comprises a cylindrical lower aperture extending there through, wherein the cylindrical shape corresponds to a shape of an in-line floor cleaner port.

15. The adapter of claim 9, further comprising lower support structures coupled between the lower ports, wherein the lower support structures provide added strength to the adapter.

16. The adapter of claim 9, wherein each lower port is spaced an equal radial distance from a center of base member.

17. The adapter of claim 16, wherein each lower port is distributed substantially equal arc lengths from each adjacent lower port.

18. An in-floor pool cleaning system comprising:
   a five port in-floor pool cleaning system;
   a six port valve; and
   an adapter comprising:
      a base member having a top and a bottom surface;
      six upper ports coupled to the top surface of the base member, each upper port including an upper aperture extending through the upper port and through the base member; and
      five lower ports coupled to the bottom surface of the base member, each lower port including a lower aperture extending through the lower port and through the base member, wherein four of lower ports are in fluid communication four of the upper ports and one of the lower ports are in fluid communication with two of the upper ports, wherein the five port in-floor pool cleaning system is coupled to the five lower ports and the six port valve is coupled to the six upper ports and the five lower ports.

19. The system of claim 18, wherein:
   each upper port is spaced an equal radial distance from a center of base member and is distributed substantially equal arc lengths from each adjacent upper port; and
   each lower port is spaced an equal radial distance from a center of base member and is distributed substantially equal arc lengths from each adjacent lower port.

* * * * *